(12) United States Patent
Moessner

(10) Patent No.: US 7,239,984 B2
(45) Date of Patent: Jul. 3, 2007

(54) OUTLIER CORRECTION

(75) Inventor: Ralph Moessner, Pfinztal (DE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 11/021,674

(22) Filed: Dec. 23, 2004

(65) Prior Publication Data
US 2005/0137835 A1    Jun. 23, 2005

(30) Foreign Application Priority Data
Dec. 23, 2003    (EP) ................... 03029698

(51) Int. Cl.
*H03F 1/26*    (2006.01)
*H04B 15/00*    (2006.01)
*G06F 17/18*    (2006.01)

(52) U.S. Cl. ...................... 702/193; 702/181

(58) Field of Classification Search ........ 702/179–181, 702/190, 191, 193, 195, 197; 705/10
See application file for complete search history.

(56) References Cited

U.S. PATENT DOCUMENTS

2005/0043598 A1 *   2/2005   Goode et al. ............... 600/316
2005/0137830 A1 *   6/2005   Moessner et al. ........... 702/176
2005/0165635 A1 *   7/2005   Moessner .................... 705/10

FOREIGN PATENT DOCUMENTS

EP    1 548 623    *   6/2005

* cited by examiner

*Primary Examiner*—Michael Nghiem
(74) *Attorney, Agent, or Firm*—Blakely, Sokoloff, Taylor & Zafman, LLP

(57) ABSTRACT

The invention provides methods and apparatus, including computer program products, for correcting outlier values in a series of values representing a predetermined numerical parameter over time. For predetermined time interval with a beginning (b) and end (e) point of the time series, an ex-post forecast time series (s_ep) is calculated using the historical time series (s_h) and a predetermined model function (f). Lower and upper tolerance limit lines are defined using (s_ep) and on a quality function (qf) over the time interval. Beginning at (b), (s_h) is corrected by replacing the first value outside of the tolerance lines by a predetermined value inside the tolerance lines. The (s_ep) is recalculated using (s_h) and (f). The tolerance lines are redefined using the recalculated (s_ep) and (qf) that takes only values where the last outlier value has been replaced. These steps are repeated until all (s_h) outlier values have been replaced.

10 Claims, 5 Drawing Sheets

OUTLIER CORRECTION

BACKGROUND OF THE INVENTION

Field

This application relates to outlier correction. Outliers (or outlier values) are values in a signal which exceed a given tolerance lane with respect to a "normal" situation by far, i.e., which are outside the tolerance of the expected value of the signal. Such a signal may be represented as discrete series of values over time. In a time series describing production figures of a production process in a supply chain management (SCM) application, a cause for outliers may be production interruption due to a natural disaster, or a production peak due to extraordinary advertising activities. The outliers in an actual series of parameter values are removed in order to get a series of values which represent the "normal" expected development of the process over time. This corrected series of values may then be used as a basis of a forecast of the process for the future.

In the art, there exists an algorithm for outlier correction in a historical time series. In order to detect outliers, an ex-post forecast is performed with a predetermined forecast method on the basis of a given historical time series. After that, the ex-post forecast is compared with the actual historical time series point for point. If a historical value differs "strongly" from the corresponding ex-post value, the historical value is set to the ex-post forecast value. In order to define what a "strong" deviation is, a so called tolerance lane is created around the ex-post forecast. The width of the tolerance lane is defined by the mean absolute deviation (MAD) of the ex-post forecast time series and the actual time series, and a given sigma factor (to be defined by the user). The width of tolerance lane t may then be defined as $t=$sigma*MAD.

This procedure suffers from the following disadvantages:

The ex-post forecast itself is strongly influenced by outliers, which can lead to the situation that many ex-post values are much to high or low, and values following the outliers are corrected to much to high ex-post values.

The tolerance lane is calculated with the MAD of the whole time series, which can strongly be influenced by existing outliers. This can lead to the situation that an outlier cannot be detected because a second stronger outlier increases the resulting MAD inappropriately.

The outliers are always corrected to the ex-post values. There is no possibility of setting the outliers to the value of the tolerance lane, which would represent a smoother correction.

The ex-post forecast calculated by exponential smoothing methods always reacts to the history with one period lag. This makes outlier control difficult, in particular for seasonal historical data.

SUMMARY OF THE INVENTION

Embodiments of the present invention provide a method and apparatus for correcting outliers in time series which method and apparatus have a stable characteristics with respect to strong outlier values.

In general, in one aspect, this invention provides methods and apparatus, including computer program products, for correcting outlier values in a series of values over time, the values representing a predetermined numerical parameter, the method comprising the following operations:

for a predetermined time interval of the time series, the time interval having a beginning point (b) and an end point (e), a) calculating an ex-post forecast time series (s_ep) on the basis of the historical time series (s_h) and a predetermined model function (f);

b) defining a lower tolerance limit line (t_min) and an upper tolerance limit line (t_max) on the basis of the ex-post forecast time series and on a quality function (qf) over the time interval;

c) beginning at the beginning point (b) of the time interval, correcting the historical time series by replacing the first value of the historical time series (s_h) outside of the tolerance lines by a predetermined value not outside the tolerance lines (t_min, t_max);

d) recalculating the ex-post forecast time series (s_ep) on the basis of the corrected historical time series (s_h) and the predetermined model function; and redefining the tolerance lines on the basis of the recalculated ex-post forecast time series (s_ep) and the quality function, whereby the quality function (qf) takes only values into account until the time point where the last outlier value has been replaced;

repeating steps c) to e) until all outlier values of the historical time series (s_h) have been replaced.

When an outlier in the historical time series is detected, the system corrects the outlier and recalculates the ex-post forecast with the corrected historical value. With help of this strategy, the influence of outliers to the ex-post forecast is minimized.

To calculate the tolerance lane not the overall MAD of the ex-post forecast is used but only the MAD calculated from the start of historical values to the current period is taken into account.

In one embodiment of the invention, it is customizable whether or not the outliers are set to the ex-post (center) forecast value or to the value of the corresponding tolerance lane.

One of the underlying ideas of the invention is that the data is checked from periods lying in the far history to periods lying in the close history, and that the data points between the start of the historical horizon and the period currently checked are smooth and trustworthy.

Advantageous implementations can include one or more of the following features.

The quality function qf may be the mean average deviation between corresponding values of the historical time series s_h and the ex-post forecast time series s_ep.

The predetermined replacement value can be chosen to be the value on the tolerance line t_min, t_max closer to the outlier value or the value of the ex-post forecast time series s_ep.

The first recalculation of the tolerance lines may only be made after a predetermined number of time points after the beginning point (b) of the time interval.

A recalculation of the tolerance lines may only be made if a predetermined number of time points have not been corrected.

The parameter may be one of economical, statistical, physical entity.

The invention further comprises a method of forecasting values of a numerical parameter in future by using a forecast model, the method comprising the following steps:

Determining model parameters on the basis of a time series (s_h) of parameter values in the past, whereby the time series (s_h) of the past is corrected by the method of claim 1;

Forecasting the future values by applying the model with the parameters determined in the preceding step.

In particular, the invention comprises also computer systems for performing the inventive methods.

Furthermore, the invention comprises computer-readable storage media comprising program code for performing the inventive methods, when loaded into a computer system.

BRIEF DESCRIPTION OF DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
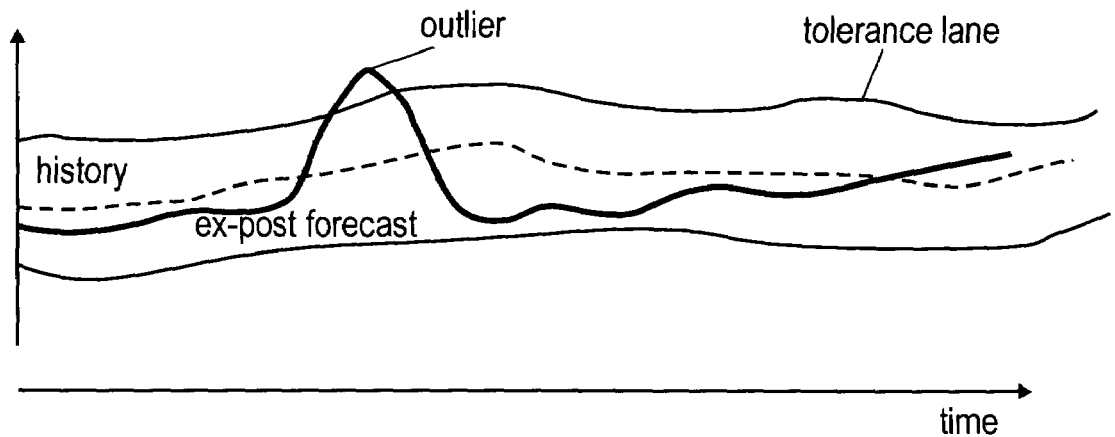
FIG. 1 illustrates an ex-post forecast time series versus a historical time series.

An embodiment of the present invention is described with reference to FIGS. 1 to 4. FIG. 1 shows an ex-post forecast time series, denoted s_ep, in comparison to a historical time series, denoted s_h. Both curves are comprised of n points each. The history curve s_h gives the actual time series of a parameter value in the past. The parameter may be representative of any economical process. However, the inventive method can also be applied to time series of physical or other technical parameters. The ex-post forecast curve s_ep is a time series which has been computed by using an appropriate model on the basis of the historical time series and only for the past (i.e., for the same time interval as the historical time series), i.e., s_ep=f(s_h), see step 20 in FIG. 3A. In steps 40, and 50 a lower upper limit line t_min and an upper limit line t_max are computed, which define the width t of the tolerance lane around the ex-post forecast. The width t of the tolerance lane may be defined as $t = \text{sigma} \ast \text{MAD}$, whereby MAD is, for example, the mean absolute deviation between the corresponding values of historical time series and the ex-post forecast time series, see step 30. However, other suitable quality functions qf may be used instead of MAD. sigma is a constant which may be defined by the user.

Figure 2:
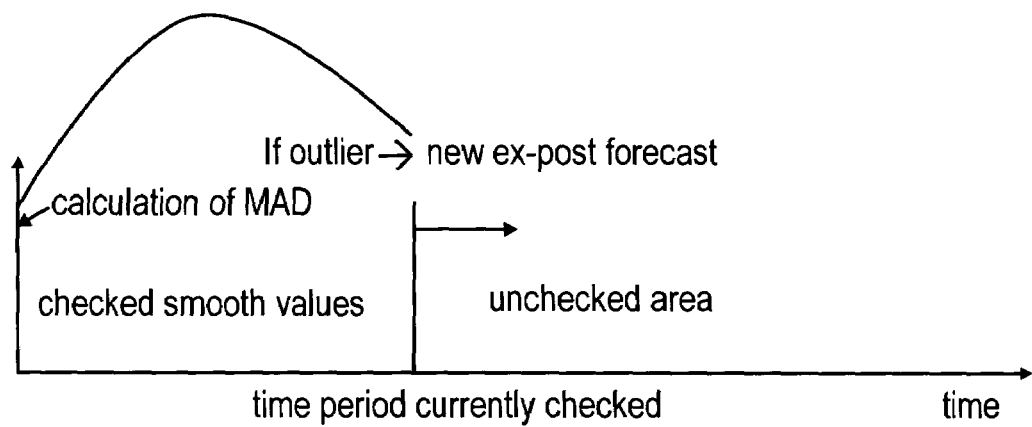
FIG. 2 illustrates the method during correcting process according to the present invention.
Figure 3A:
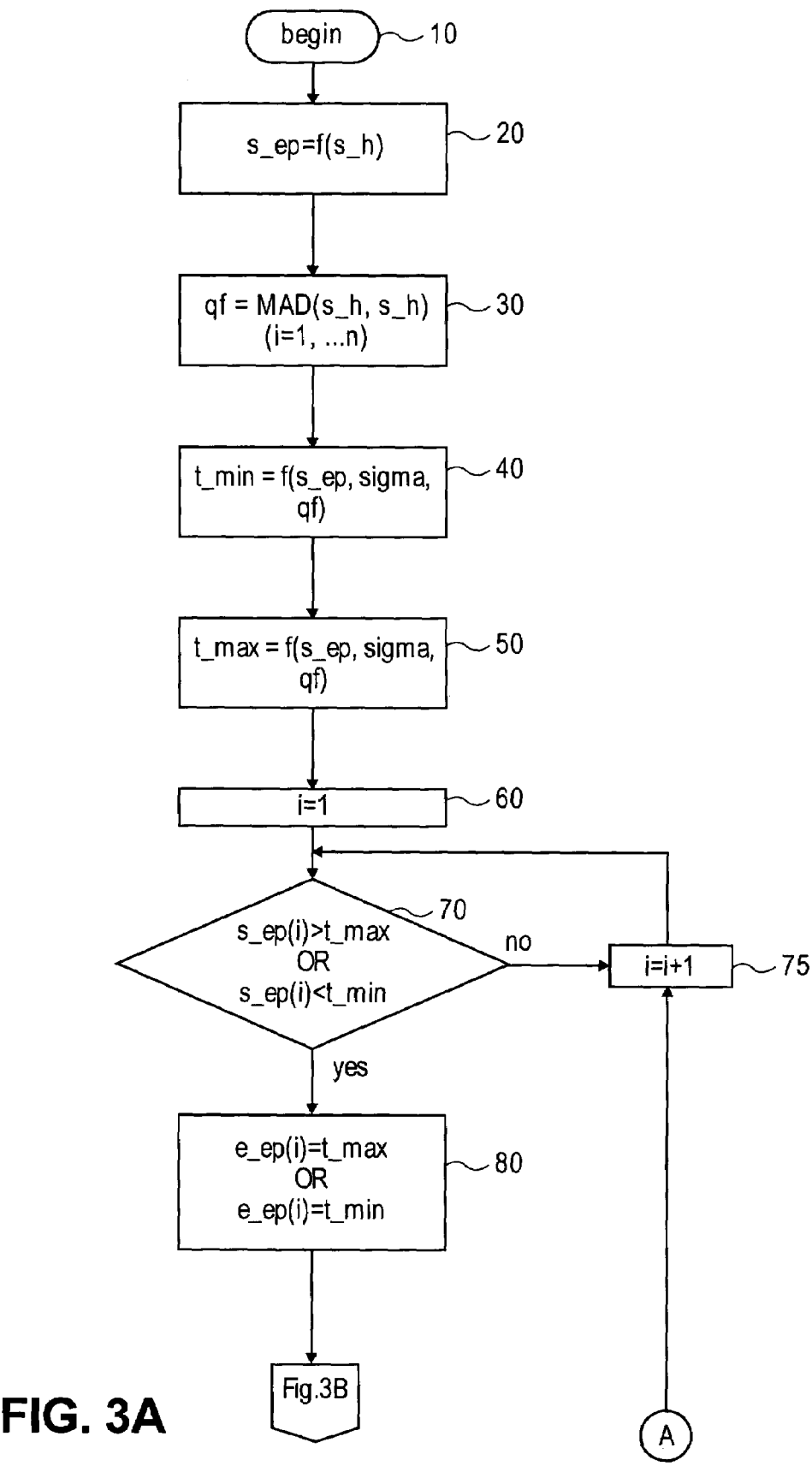
FIGS. 3A, B illustrate the program flow of an embodiment according to the present invention.
Figure 3B:
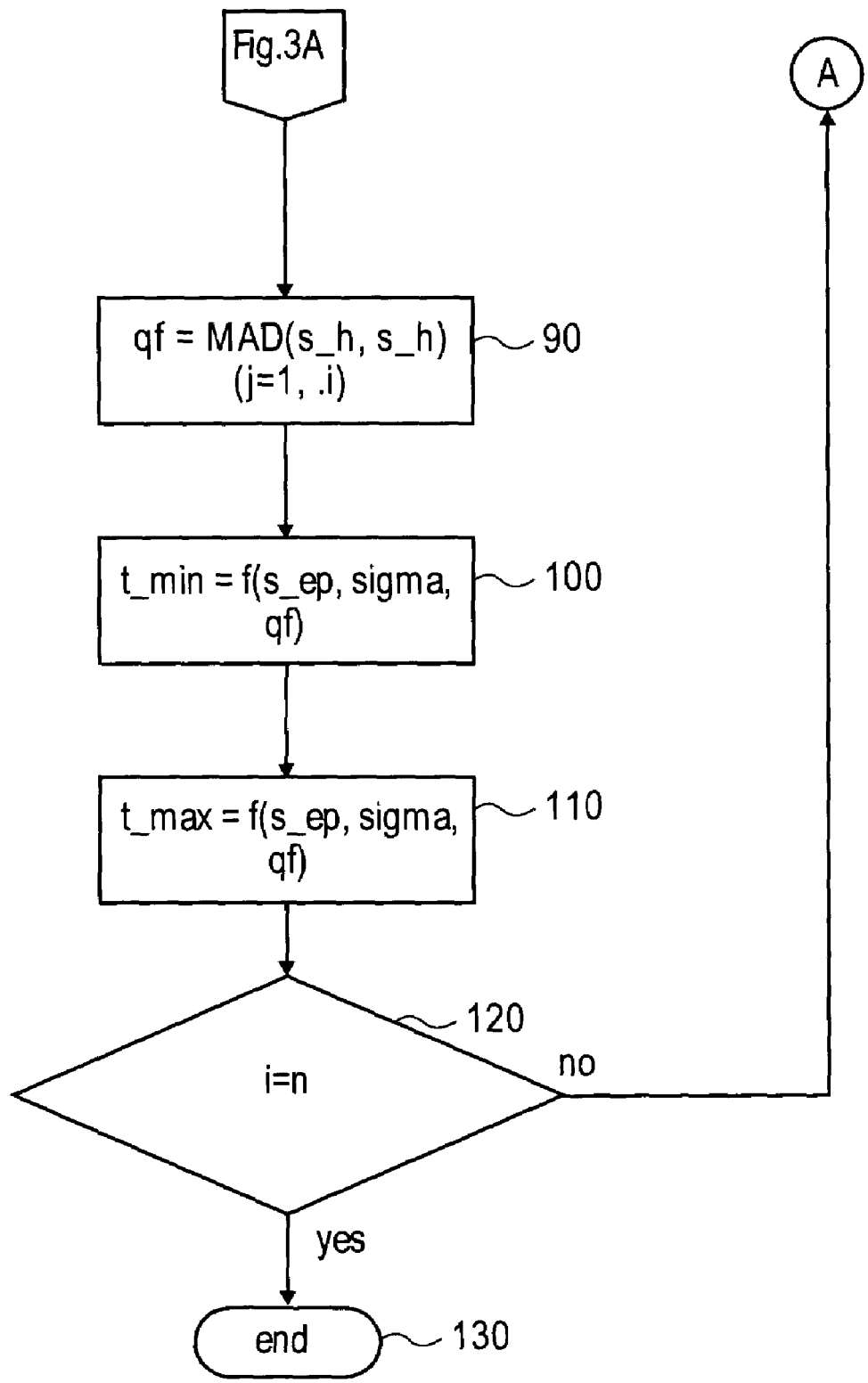

The correction method according to the invention is further described with reference to FIGS. 2 and 3A, B. According to the correction method, in steps 70 to 120, the ex-post forecast curve s_ep is iteratively corrected by removing outlier values by suitable other values. The values of the historical time series s_h are checked for outliers from left to right, i.e., from times more in the past to times more in the presence. When an outlier is detected, see step 70, the value of the outlier is replaced by the value of the one tolerance line (of the same position) which is closer to the outlier value, see step 80, or by the ex-post forecast value at the respective position. Otherwise, if no outlier is detected in step 70, the program flow proceeds with checking the next value of the time series, by increasing the index i to i+1, see step 75.

If an outlier has been detected in step 70, then, in step 90, the MAD (or another quality function) is re-computed on the basis of the newly computed historical time series s_ep and the historical time series s_h. Since one outlier value has been removed, the resulting MAD is smaller than before. On the basis of that smaller MAD and the sigma value as before, the width t, i.e., the curves t_min, t_max, of the tolerance lane is re-computed in steps 100, and 110. This width is smaller than before.

Then, the program loops, via step 75, back to step 60, to search the next outlier on the basis of the smaller tolerance lane, and the replacement and recalculation processes described above are repeated when an outlier is detected.

This process is repeated until the complete time series has been completed, i.e., all n values of the time series have been checked for outlier, see step 120.

The historical time series s_h thus obtained may be used to perform a forecast for the future.

This new strategy will deliver much better results than the known method described above.

Some enhancements to the performance of the invention can be made. One enhancement concerns a historical time series which begins with an outlier. For example, the historical time series

100;5;5;5;5;5;5;5;5 forecasted with a constant model would be corrected to the time series

100;100;100;100;100;100;100;100;100;100.

This is due to the fact that the method would "trust" the first value of 100 more than the second value of 5, and the further periods all containing the value of 5 would be without effect because they are in the still unchecked area. And now step by step the method will shift the value of 100 through all time points. In addition, the same behavior could be observed with a time series like

5;5;5;5;5;5;100;100;100;100 where the resulting time series would be

5;5;5;5;5;5;5;5;5;5;.

A further embodiment of the present invention deals with such cases. In this embodiment, two parameters are introduced to the inventive algorithm as described above. First, a starting phase is introduced, i.e., a phase of several points at the beginning of the time interval to be checked, during which no re-calculation of an ex-post forecast is performed, and the overall MAD of the first ex-post forecast is used. The number of periods of a starting phase can be user-defined. The default value of this starting phase is set to three.

Second, a number of "stable" periods can be defined after which a recalculation of an ex-post forecast is allowed. A "stable" period is a period of points without outlier correction. The number of points can also be user-defined. The default value is set to two. This means a recalculation of an ex-post forecast is only done if at least the two periods before the detected outlier have not been corrected.

The introduction of the above mentioned parameters ensures that the outlier correction will never behave worse than the algorithm of the art. For example, the time series 5; 5; 5; 5; 5; 5; 100; 100; 100; 100 will be corrected to 5; 5; 5; 5; 5; 5; 5; 5; 53; 100; 100.

Figure 4:
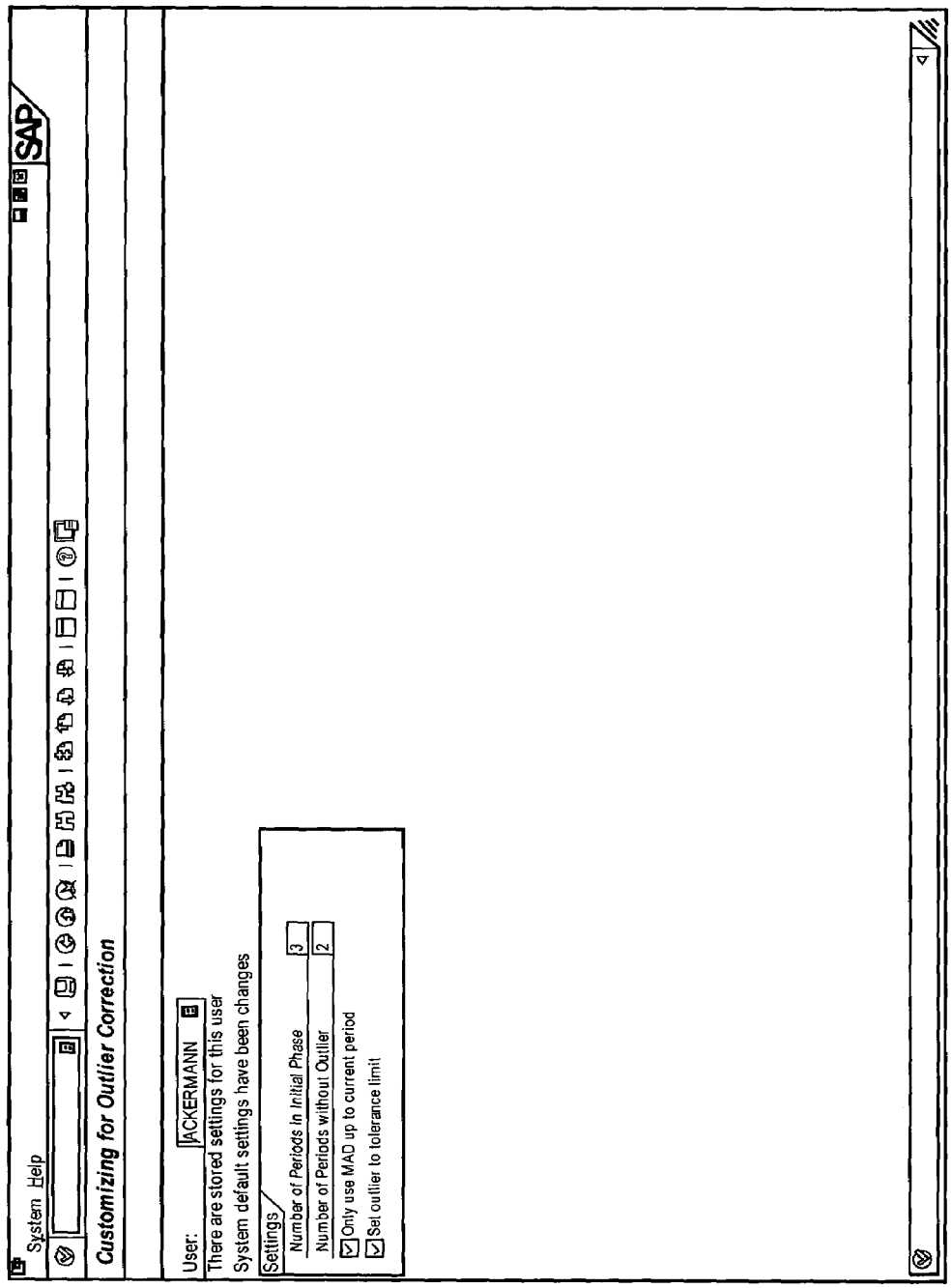
FIG. 4 illustrates a screen shot of a computer program embodying the present invention.

FIG. 4 displays a screenshot of a software performing the method according to the inventive embodiment described above. A new user dependent customizing for outlier correction is provided where the above mentioned parameters can be set. In addition, the user can decide how he wants to correct the outliers (setting to ex-post value or value of the tolerance lane) and if he wants to use the overall MAD or the current MAD, i.e., the MAD which is calculated only over points which have already been checked.

Figure 5:
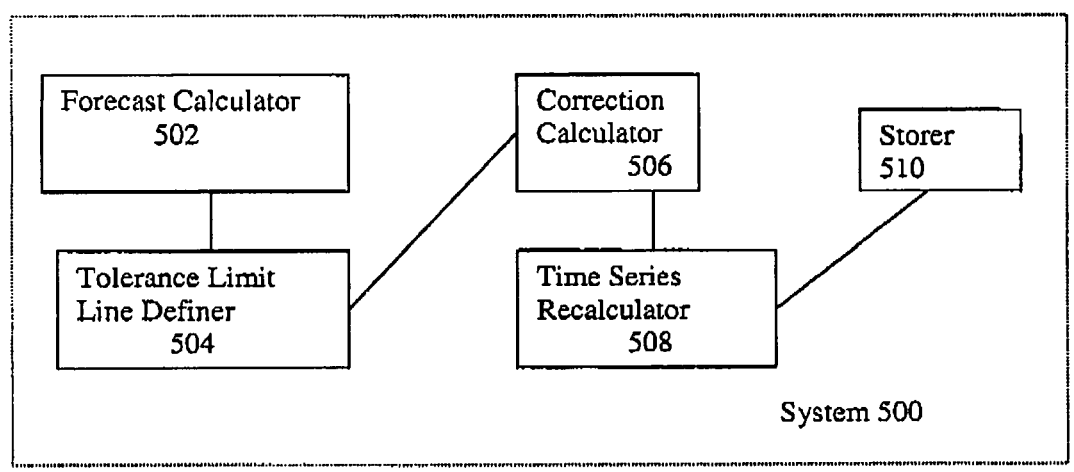
FIG. 5 illustrates a system that embodies the present invention.

FIG. 5 illustrates an embodiment of the present invention. System 500 contains a Forecast Calculator 502 which using the historical time series (s_h) calculates the ex-post forecast time series s_ep). This time series along a quality function (qf) is used by the Tolerance Limit Line Definer 504 to define the lower tolerance limit line (t_min) and an upper tolerance limit line t_max). Starting from the beginning point (b), the Correction Calculator 506 then replaces the first value of the historical time series (s_h) outside of the tolerance line by a predetermined value thin is not outside the tolerance line. The Time Series Recalculator 508 then recalculates the ex-post forecast time series (s_ep). This process is repeated until there are no more outlier values in the corrected historical time series (s_h). Once all the outlier values have been corrected, the Storer 510 stores the corrected historical time series (s_h) for later use.

The runtime of a single forecast calculation can be yet increased with the outlier correction using ex-post method with a repeated call to the basis forecast module. In a standard customer scenario with a forecast performed in weeks and 107 weeks historical data we will have the following situation. The initialization phase would be 55 periods, and the ex-post phase would be 52 weeks (assuming automatic model selection procedures or seasonal trend approaches). In the worst case, each 3 periods a new ex-post calculation has to be started. This would lead to 17 calculations of the ex-post forecast. In addition, there are customizing possibilities to dramatically decrease the number of ex-post forecast calculations, such as the number of points at the beginning of the time interval during which no re-calculation of an ex-post forecast is performed, or the number of stable periods, or the number of outliers to be detected before re-calculating the ex-post forecast.

The present techniques can be implemented in digital electronic circuitry, or in computer hardware, firmware, software, or in combinations of them. Apparatus of the invention can be implemented in a computer program product tangibly embodied in a machine-readable storage device for execution by a programmable processor. Method steps according to the invention can be performed by a programmable processor executing a program of instructions to perform functions of the invention by operating on the basis of input data, and by generating output data. The invention may be implemented in one or several computer programs that are executable in a programmable system, which includes at least one programmable processor coupled to receive data from, and transmit data to, a storage system, at least one input device, and at least one output device, respectively. Computer programs may be implemented in a high-level or object-oriented programming language, and/or in assembly or machine code. The language or code can be a compiled or interpreted language or code. Processors may include general and special purpose microprocessors. A processor receives instructions and data from memories, in particular from read-only memories and/or random access memories. A computer may include one or more mass storage devices for storing data; such devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by or incorporated in ASICs (application-specific integrated circuits).

The computer systems or distributed computer networks as mentioned above may be used, for example, for producing goods, delivering parts for assembling products, controlling technical or economical processes, or implementing telecommunication activities.

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical or text user interface through which computer programs interact with users.

A computer may include a processor, memory coupled to the processor, a hard drive controller, a video controller and an input/output controller coupled to the processor by a processor bus. The hard drive controller is coupled to a hard disk drive suitable for storing executable computer programs, including programs embodying the present technique. The I/O controller is coupled by means of an I/O bus to an I/O interface. The I/O interface receives and transmits in analogue or digital form over at least one communication link. Such a communication link may be a serial link, a parallel link, local area network, or wireless link (e.g. an RF communication link). A display is coupled to an interface, which is coupled to an I/O bus. A keyboard and pointing device are also coupled to the I/O bus. Alternatively, separate buses may be used for the keyboard pointing device and I/O interface.

Other embodiments are in the scope of the following claims.

The invention claimed is:

1. Method for correcting outlier values in a series of values over time, the values representing a predetermined numerical parameter, the method comprising:

for a predetermined time interval of the time series, the time interval having a beginning point (b) and an end point (e),
  a) calculating an ex-post forecast time series (s_ep) on the basis of the historical lime series (s_h) and a predetermined model function (f);
  b) defining a lower tolerance limit line (t_min) and an upper tolerance limit line (t_max) on the basis of the ex-post forecast time series and on a quality function (qf) over the time interval;
  c) beginning at the beginning point (b) of the time interval, correcting the historical time series by replacing the first value of the historical time series (s_h) outside of the tolerance lines by a predetermined value not outside the tolerance lines (t_min, t_max);
  d) recalculating the ex-post forecast time series (s_ep) on the basis of the corrected historical time series (s_h) and the predetermined model function; and redefining the tolerance lines on the basis of the recalculated ex-post forecast time series (s_ep) and the quality function, whereby the quality function (qf) takes only values into account until the time point where the last outlier value has been replaced;

e) repeating c) to e) until all outlier values of the historical time series (s_h) have been replaced; and storing the corrected historical time series is (s_h) for later use by a user.

2. The method of claim 1, wherein the quality Function (qf) is the mean average deviation between corresponding values of the historical time series (s_h) and the ex-post forecast time series (s_ep).

3. The method according to claim 1, wherein the predetermined replacement value can be chosen to be the value on the tolerance line (t_min, t_max) closer to the outlier value or the value of the ex-post forecast time series (s_ep).

4. The method according to claim 1, wherein the first recalculation of the tolerance lines is only made after a predetermined number of time points after the beginning point (b) of the time interval.

5. The method according to claim 1, wherein a recalculation of the tolerance lines is only made if a predetermined number of time points have not been corrected.

6. The method according to claim 1, wherein the parameter is one of economical, statistical, physical entity.

7. A method of forecasting values of a numerical parameter in future by using a forecast model, the method comprising:

the method according to claim 1;

determining model parameters on the basis of a historical time series (s_h) of parameter values; and forecasting the future values by applying the model with the parameters determined; and, storing the corrected historical time series (s_h).

8. The method of claim 7 wherein the parameter is one of economical, statistical, physical entity.

9. A system comprising:

means for calculating an ex-post forecast time series (sep) on the basis of the historical time series (s_h) and a predetermined model function (f);

means for defining a lower tolerance limit line (t_min) and an upper tolerance limit line (t_max) on the basis of the ex-post forecast time series and on a quality function (qf) over the time interval;

means for beginning at the beginning point (b) of the time interval, correcting the historical time series by replacing the first value of the historical rime series (s_h) outside of the tolerance lines by a predetermined value not outside the tolerance lines (t_min, t_max);

means for recalculating the ex-post forecast time series (s_ep) on the basis of the corrected historical time series (s_h) and the predetermined model function; and redefining the tolerance lines on the basis of the recalculated ex-post forecast time series (s_ep) and the quality function, whereby the quality function (qf) takes only values into account until the time point where the last outlier value has been replaced; and means for storing the corrected historical time series (s_h) for later use by a user.

10. A machine-accessible medium containing instructions that, when executed, cause a machine to:

for a predetermined time interval of the time series, the time interval having a beginning point (b) and an end point (e).

a) calculate an ex-post forecast time series (s_ep) on the basis of the historical time series (s_h) and a predetermined model function (f);

b) define a lower tolerance limit line (t_min) and an upper tolerance limit line (t_max) on the basis of the ex-post forecast time series and on a quality function (qf) over the time interval;

c) beginning at the beginning point (b) of the time interval, correct the historical time series by replacing the first value of the historical time series (s_h) outside of the tolerance lines by a predetermined value not outside the tolerance lines (t_min, t_max);

d) recalculate the ex-post forecast time series (s_ep) on the basis of the corrected historical time series (s_h) and the predetermined model function; and redefining the tolerance lines on the basis of the recalculated ex-post forecast time series (s_ep) and the quality function, whereby the quality function (qf) takes only values into account until the time point where the last outlier value has been replaced;

e) repeat c) to e) until all curlier values of the historical time series (s_h) have been replaced; and store the corrected histroical time series (s_h) for later use by a user.

* * * * *

UNITED STATES PATENT AND TRADEMARK OFFICE
CERTIFICATE OF CORRECTION

PATENT NO. : 7,239,984 B2  Page 1 of 1
APPLICATION NO. : 11/021674
DATED : July 3, 2007
INVENTOR(S) : Ralph Moessner It is certified that error appears in the above-identified patent and that said Letters Patent is hereby corrected as shown below:

Col. 8;
In Claim 9, line 1, please delete "rime" and insert -- time --.

Col. 8;
In Claim 10, line 42, please delete "curlier" and insert -- outlier --.

Signed and Sealed this

Twenty-first Day of July, 2009

JOHN DOLL
*Acting Director of the United States Patent and Trademark Office*